Patented Oct. 14, 1947

2,429,031

UNITED STATES PATENT OFFICE 2,429,031

HALOGENATION OF ALPHA, BETA-UNSATURATED NITRILES

Jack D. Robinson, Cuyahoga Falls, Ohio, assignor to Wingfoot Corporation, Akron, Ohio, a corporation of Delaware No Drawing. Application February 23, 1945, Serial No. 579,487

4 Claims. (Cl. 260—464)

This invention relates to a novel method for halogenating unsaturated compounds. The method is especially valuable for the halogenation of unsaturated nitriles, such as acrylonitrile and alpha-methacrylonitrile.

When unsaturated nitriles are treated with an elemental halogen it is usually quite difficult to initiate the reaction. The cause of this difficulty is not known. Accordingly, one of the objects of this invention is to provide a dependable method for instantly initiating the reaction between halogens and unsaturated nitriles. A further object of the invention is to eliminate the long induction period usually required in adding halogen atoms on the unsaturated bonds of nitriles.

In accordance with this invention, it has been found that when chlorine or other halogen is passed into a mass of liquid unsaturated nitrile, an instantaneous reaction is possible if small amounts of hydrogen chloride or other hydrogen halide are present. The function of the HCl is that of a catalyst and consequently any catalytic quantity may be used. Although the use of one to three percent is preferred, small quantities, for example, 0.05 percent and large quantities, for example, 10 percent or more, are also effective. The hydrogen halide need not contain the same halogen which is being reacted; thus, hydrogen chloride is a useful catalyst for the preparation of bromine derivatives and hydrogen iodide and hydrogen bromide are useful in the preparation of the chlorine derivatives. Obviously it is preferable to use the hydrogen halide corresponding to the halogen used in the reaction, since thereby the formation of a mixed halide is avoided.

The halogenations may be conducted by passing the halogen directly into the unsaturated compound to be reacted at room temperature or at slightly elevated temperatures, for example, up to the boiling point of the nitrile. At the beginning of the reaction a small stream of hydrogen chloride is added until the chemical reaction begins, as evidenced by an increase in temperature. Alternatively, the nitrile may be saturated with hydrogen chloride prior to the introduction of the elemental halogen. Since the addition of halogen to unsaturated compounds is an exothermic reaction, it may be necessary to cool the reaction mass or to add the reactants gradually in order to prevent the development of excessive temperatures.

Further details of the practice of this invention are set forth in the following specific examples.

Example 1

Acrylonitrile (1060 grams) was placed in a two-liter reaction flask provided with a glass tube having one end beneath the surface of the acrylonitrile and adapted to introduce chlorine thereinto. The addition of chlorine was continued for 10 hours with no apparent chemical reaction; no heat was evolved, and the mass retained a yellowish color attributable to the dissolved chlorine. The reaction mass was then treated with a small amount of anhydrous hydrogen chloride and the chlorination treatment renewed. Immediately a chemical reaction was induced, as evidenced by a slight increase in temperature, and a change in the color of the reaction mass.

Example 2

Example 1 was repeated, except that the anhydrous hydrogen chloride was added to the acrylonitrile before the chlorine was introduced. A chemical reaction began as soon as the chlorine stream contacted the acrylonitrile.

Example 3

A 5000 gram quantity of acrylonitrile was placed in a 10 liter flask equipped with a chlorine inlet tube. The chlorine was passed into the reaction mass until the solution became saturated. A yellow-colored liquid was thereby obtained. Approximately 40 grams of dry hydrogen chloride was then added. The yellow discoloration in the liquid disappeared almost immediately, thereby definitely showing that the addition reaction had taken place.

This method is particularly adapted to the preparation of dichloronitriles, such as, alpha-beta-dichloropropionitrile, beta, gama-dichloro-butyro nitrile, alpha, beta-dichloro-alpha-ethyl-propionitrile, propionic and other dichloro nitriles prepared from the corresponding unsaturated nitriles by chlorination. The alpha, beta-dibromo derivatives may also be prepared in similar manner by the practice of this invention.

Although the invention has been described with respect to specific examples, it is not intended that the details thereof shall be construed as limitations upon the scope of the invention, except to the extent included in the following claims.

I claim:

1. In a method of preparing a dihalonitrile by the reaction between an alpha, beta-unsaturated nitrile and a halogen, the step of initiating the reaction in the presence of an anhydrous hydrogen halide.

2. In a method of preparing a dichloronitrile by the reaction between an alpha, beta-unsaturated nitrile and chlorine, the step of initiating the reaction in the presence of a catalytic amount of anhydrous hydrogen chloride.

3. In a method of preparing a dihalonitrile by the reaction between an alpha, beta-unsaturated nitrile and a halogen, the step of initiating the reaction in the presence of 1 to 3 percent of an anhydrous hydrogen halide.

4. In a method of preparing a dichloronitrile by the reaction between an alpha, beta-unsaturated nitrile and chlorine, the step of initiating the reaction in the presence of 1 to 3 percent of anhydrous hydrogen chloride.

JACK D. ROBINSON.

REFERENCES CITED

The following references are of record in the file of this patent:

UNITED STATES PATENTS

| Number | Name | Date |
|---|---|---|
| 2,231,838 | Lichty | Feb. 11, 1941 |
| 2,365,808 | D'Ianni | Dec. 26, 1944 |
| 2,231,363 | Long | Feb. 11, 1941 |
| 2,231,360 | D'Ianni | Feb. 11, 1941 |
| 2,353,563 | Hemminger | July 11, 1944 |
| 2,384,889 | Clifford et al. | Sept. 18, 1945 |
| 2,298,739 | Lichty et al. | Oct. 13, 1942 |
| 2,390,470 | Sumner | Dec. 4, 1945 |

FOREIGN PATENTS

| Number | Country | Date |
|---|---|---|
| 115,650 | Australia | Aug. 13, 1942 |
| 547,067 | Great Britain | Aug. 12, 1942 |